United States Patent
Kudo et al.

(10) Patent No.: US 8,874,031 B2
(45) Date of Patent: Oct. 28, 2014

(54) RADIO POWER TRANSMITTING APPARATUS AND RADIO POWER TRANSMITTING SYSTEM

(75) Inventors: Hiroki Kudo, Kawasaki (JP); Noritaka Deguchi, Yokohama (JP); Daisuke Takeda, Kawasaki (JP); Ren Sakata, Yokohama (JP); Hiroki Shoki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 13/398,001

(22) Filed: Feb. 16, 2012

(65) Prior Publication Data
US 2012/0242161 A1  Sep. 27, 2012

(30) Foreign Application Priority Data
Mar. 22, 2011  (JP) .................................. 2011-62870

(51) Int. Cl.
*H04B 5/00* (2006.01)
*H02J 17/00* (2006.01)

(52) U.S. Cl.
CPC .............. *H02J 17/00* (2013.01); *H04B 5/0081* (2013.01); *H04B 5/0037* (2013.01)
USPC ..... 455/41.1; 455/41.2; 455/41.3; 455/114.1; 455/126

(58) Field of Classification Search
USPC .................. 455/41.1–41.3, 114.1–114.2, 126
See application file for complete search history.

(56) References Cited

U.S. PATENT DOCUMENTS

| | | | |
|---|---|---|---|
| 8,310,108 B2 | 11/2012 | Inoue et al. | |
| 8,334,619 B2 * | 12/2012 | Takei | ............................ 307/104 |
| 8,374,230 B2 * | 2/2013 | Yoshihara | ...................... 375/228 |
| 8,374,239 B2 * | 2/2013 | Yin et al. | ................. 375/240.12 |

(Continued)

FOREIGN PATENT DOCUMENTS

| | | |
|---|---|---|
| CN | 101867229 A | 10/2010 |
| JP | 2008-028551 A | 2/2008 |

(Continued)

OTHER PUBLICATIONS

Chinese Office Action dated Dec. 4, 2013 (and English translation thereof) in counterpart Chinese Application No. 201210059176.5.

(Continued)

*Primary Examiner* — Edward Urban
*Assistant Examiner* — Max Mathew
(74) *Attorney, Agent, or Firm* — Holtz, Holtz, Goodman & Chick PC

(57) ABSTRACT

There is provided a radio power transmitting apparatus including: a power transmitting coil, a band signal generating unit, a reflected signal measuring unit, an oscillator and a communication control unit. The coil is supplied with a signal and transmits the signal to a power receiving coil on a radio power receiving apparatus through magnetic coupling. The generating unit generates a band signal having an allowable transmission band and supplies the band signal to the power transmitting coil. The reflected signal measuring unit measures a reflected signal of the band signal from the power transmitting coil. The oscillator generates a carrier signal having a controllable oscillating frequency. The control unit determines a transmission frequency based on a frequency characteristic of the reflected signal and performs control so that a transmission signal generated by modulating the carrier signal of the transmission frequency is supplied to the power transmitting coil.

13 Claims, 13 Drawing Sheets

(56) References Cited

U.S. PATENT DOCUMENTS

| | | | |
|---|---|---|---|
| 2005/0052279 A1* | 3/2005 | Bridgelall | 340/10.1 |
| 2010/0259109 A1 | 10/2010 | Sato | |
| 2011/0187321 A1* | 8/2011 | Hirayama | 320/108 |
| 2013/0178156 A1* | 7/2013 | Kim et al. | 455/41.1 |

FOREIGN PATENT DOCUMENTS

| | | |
|---|---|---|
| JP | 2010-068634 A | 3/2010 |
| JP | 2010-141966 A | 6/2010 |
| WO | WO 2005/022454 A1 | 3/2005 |
| WO | WO 2010/030005 A1 | 3/2010 |
| WO | WO 2010/050008 A1 | 5/2010 |
| WO | WO 2010/119577 A1 | 10/2010 |

OTHER PUBLICATIONS

Japanese Office Action dated Nov. 15, 2013 (and English translation thereof) in counterpart Japanese Application No. 2011-062870.
Japanese Office Action dated Mar. 8, 2013 (and English translation thereof) in counterpart Japanese Application No. 2011-062870.
Chinese Office Action dated Jun. 30, 2014, issued in counterpart Chinese Application No. 201210059176.5.

* cited by examiner

US 8,874,031 B2

RADIO POWER TRANSMITTING APPARATUS AND RADIO POWER TRANSMITTING SYSTEM

CROSS REFERENCE TO RELATED APPLICATIONS

This application is based upon and claims the benefit of priority from the prior Japanese Patent Application No. 2011-62870, filed on Mar. 22, 2011, the entire contents of which are incorporated herein by reference.

FIELD

An embodiment relates to a radio power transmitting apparatus and a radio power transmitting system, and relates to, for example, radio communication using a resonance coil.

BACKGROUND

When carrying out radio communication using a power transmitting coil, use of a load modulation scheme or backscattering scheme is assumed which enables non-electric source driving used for RFID (Radio Frequency IDentification) or the like. When performing backscattering in the conventional RFID, the modulation scheme or frequency is made variable depending on coupling between coils.

However, when the above-described prior art is applied to magnetic resonance type radio power transmission, since transmission characteristics cannot be ascertained when information transmission starts, signals obtained by load modulation or backscattering may significantly attenuate.

DETAILED DESCRIPTION

According to an embodiment, there is provided a radio power transmitting apparatus including: a power transmitting coil, a band signal generating unit, a reflected signal measuring unit, an oscillator and a communication control unit.

The power transmitting coil is supplied with a signal and transmits the signal to a power receiving coil on a radio power receiving apparatus through magnetic coupling.

The band signal generating unit generates a band signal having an allowable transmission band and supplies the band signal to the power transmitting coil as the signal.

The reflected signal measuring unit measures a reflected signal of the band signal from the power transmitting coil.

The oscillator generates a carrier signal having a controllable oscillating frequency.

The communication control unit determines a transmission frequency based on a frequency characteristic of the reflected signal and performs control so that a transmission signal generated by modulating the carrier signal of the transmission frequency is supplied to the power transmitting coil as the signal.

Hereinafter, the present embodiment will be described in detail with reference to the attached drawings.

Figure 1:
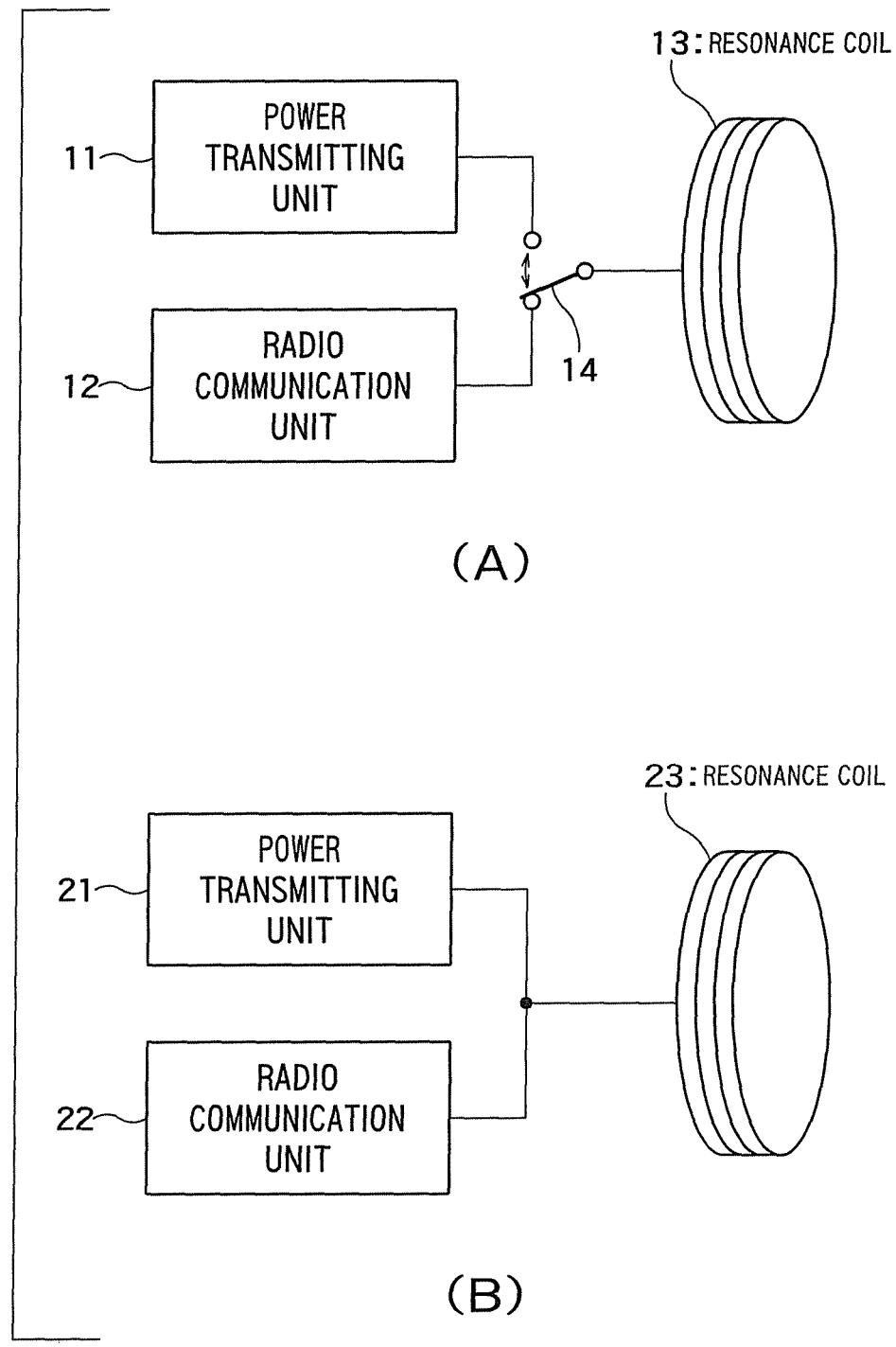
FIG. 1 is a schematic diagram of a radio power transmitting apparatus according to an embodiment.

FIG. 1(A) and FIG. 1(B) show schematic diagrams of a radio power transmitting apparatus according to the present embodiment.

The radio power transmitting apparatus in FIG. 1(A) can perform both radio power transmission and radio communication.

The radio power transmitting apparatus in FIG. 1(A) is provided with a power transmitting unit 11 that performs radio power transmission, a radio communication unit 12 that performs radio communication and a resonance coil (power transmitting coil) 13 which is a power transmitting/transmitting antenna. As a method of sharing radio power transmission and radio communication, the antenna 13 is shared using a switch 14 on a time-division basis.

The radio power transmitting apparatus in FIG. 1(B) can also perform both radio power transmission and radio communication as with FIG. 1(A) and is provided with a power transmitting unit 21, a radio communication unit 22 and a shared coil 23. Unlike FIG. 1(A), the radio power transmitting apparatus performs radio power transmission and radio communication simultaneously as a method of sharing the antenna. Various sharing methods that allow simultaneous transmission may be applicable such as a method using a resonance frequency of the resonance coil 23 for radio power transmission and using an integer multiple of resonance frequency for radio communication to thereby achieve frequency division.

Figure 2:
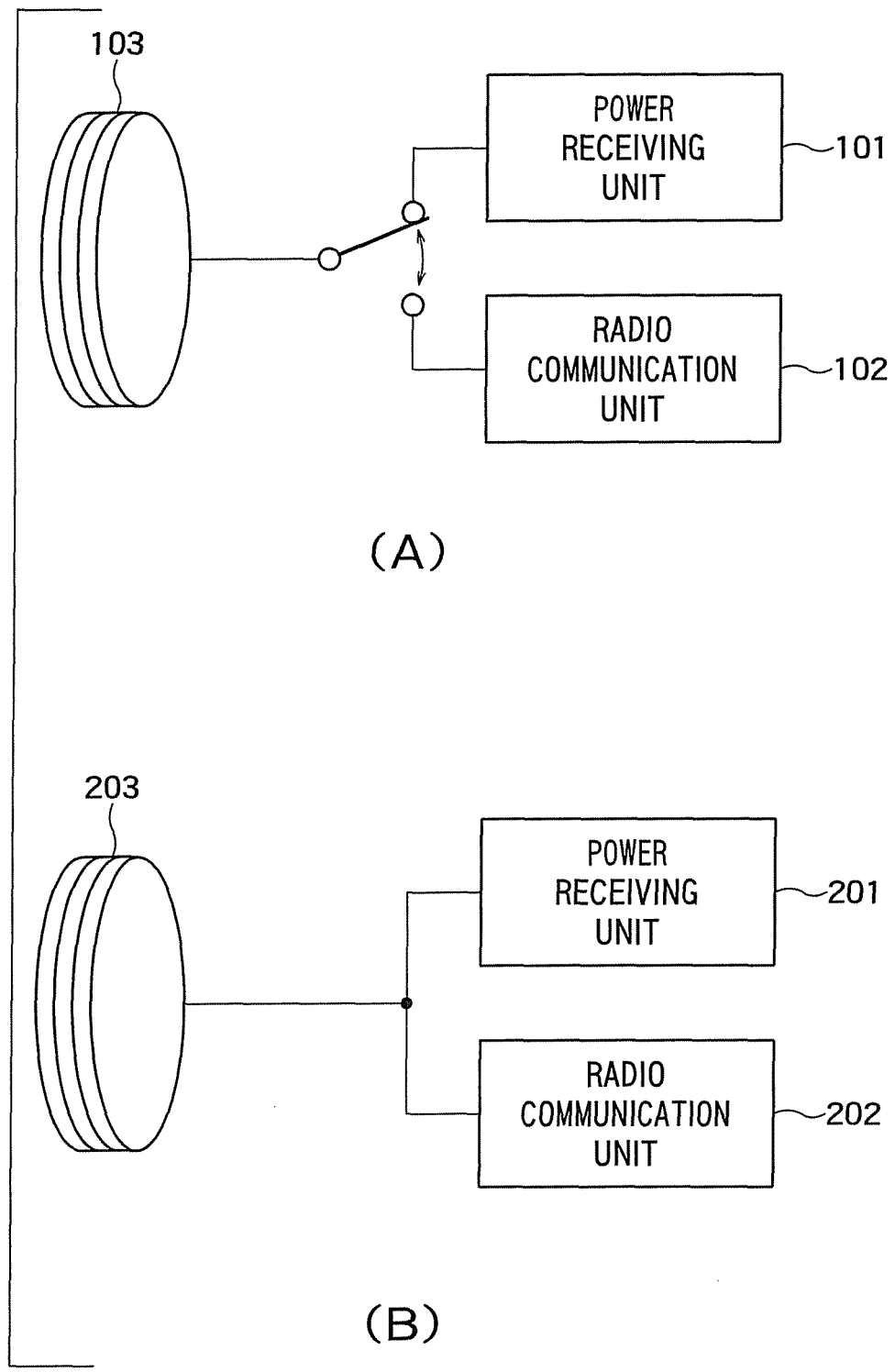
FIG. 2 is a schematic diagram of a radio power receiving apparatus according to the embodiment.

FIG. 2(A) and FIG. 2(B) show schematic diagrams of a radio power receiving apparatus according to the present embodiment.

The radio power receiving apparatus in FIG. 2(A) can perform both radio power reception and radio communication. This configuration corresponds to the configuration of the radio power transmitting apparatus in FIG. 1(A).

In FIG. 2(A), the radio power receiving apparatus is provided with a power receiving unit 101 that performs radio power reception, a radio communication unit 102 that performs radio communication and a resonance coil (power receiving coil) 103 that is a power receiving/receiving antenna. As a method of sharing the antenna for power reception and radio communication, the antenna 103 is shared using a switch 104 on a time-division basis.

The radio power receiving apparatus in FIG. 2(B) is used as a counterpart of the radio power transmitting apparatus in FIG. 1(B). As with FIG. 2(A), the radio power receiving apparatus can perform both power reception and radio communication and is provided with a power receiving unit 201, a radio communication unit 202 and a shared coil 203. As an antenna sharing method, the radio power receiving apparatus performs power reception and radio communication simultaneously. This can be done by means of frequency division or the like as in the case of the radio power transmitting apparatus in FIG. 1(B).

Figure 3:
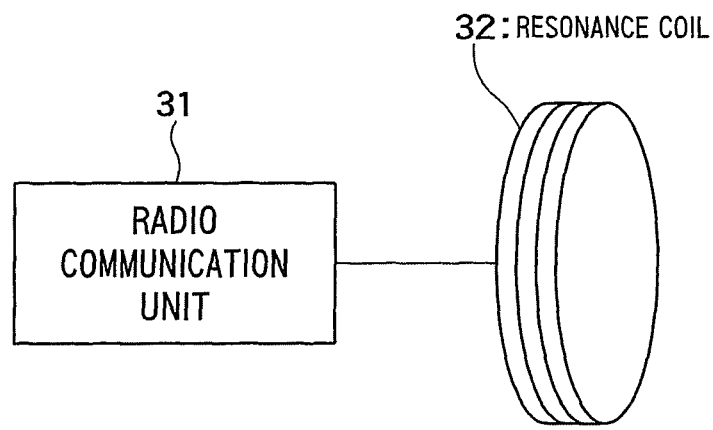
FIG. 3 is a schematic diagram of another radio power transmitting apparatus according to the embodiment.

FIG. 3 shows another configuration example of the radio power transmitting apparatus according to the present embodiment.

This radio power transmitting apparatus is constructed of a radio communication unit 31 and a resonance coil 32 and is not provided with any power transmitting unit. Since the present embodiment has a main feature in the radio communication unit, the present embodiment can be implemented by the radio power transmitting apparatus in any one of modes of in FIG. 1(A), FIG. 1(B) and FIG. 3.

Figure 4:
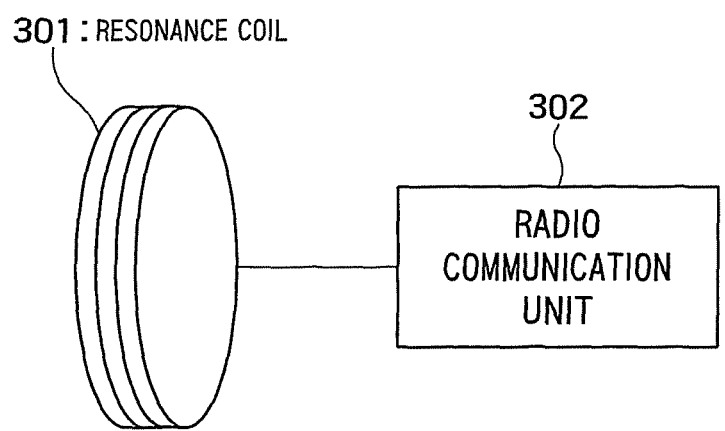
FIG. 4 is a schematic diagram of another radio power receiving apparatus according to the embodiment.

The radio power receiving apparatus can be likewise configured without the power receiving unit as shown in FIG. 4.

Figure 5:
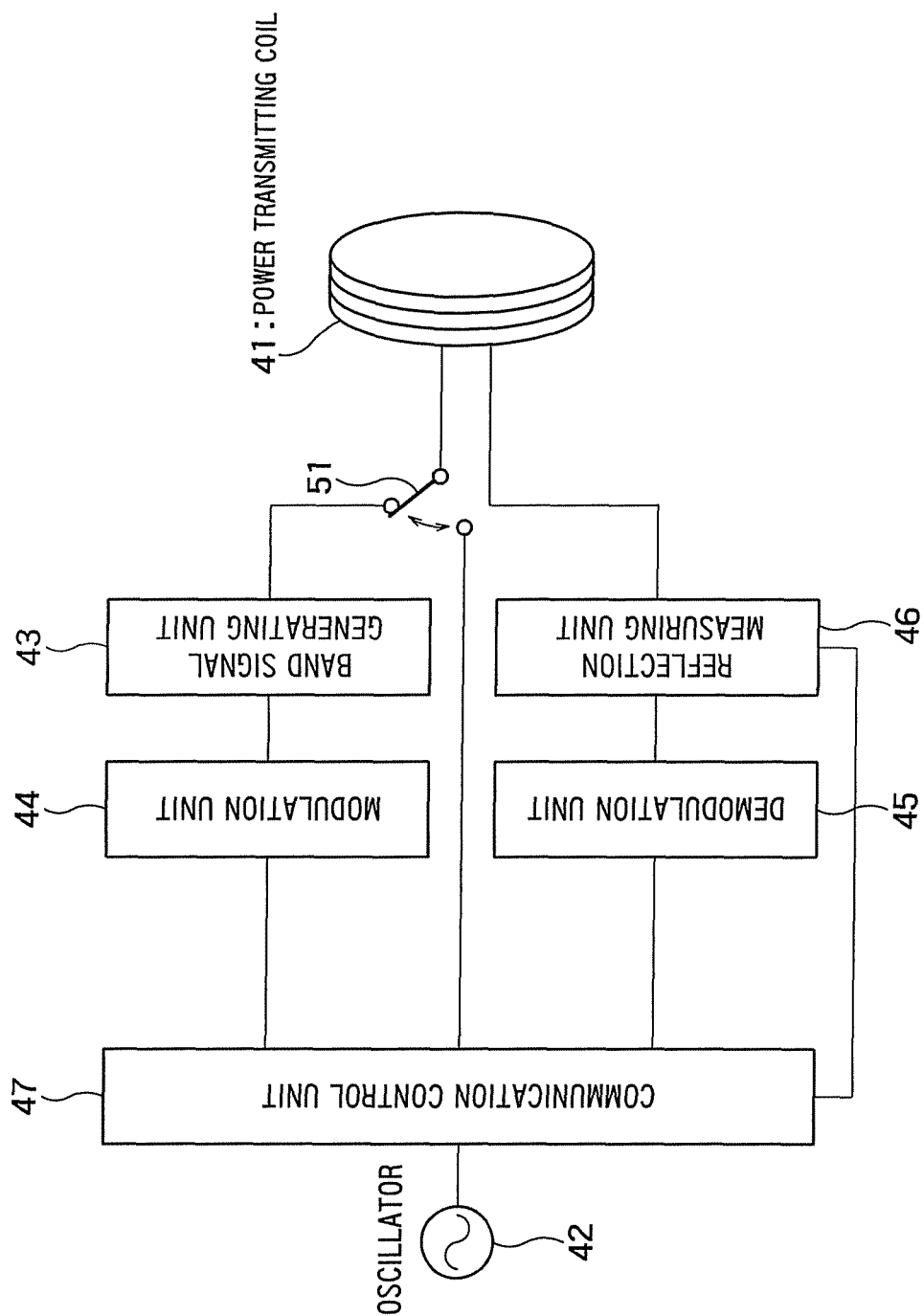
FIG. 5 is a diagram illustrating a first configuration example of the radio power transmitting apparatus in FIG. 2.

FIG. 5 shows a first configuration example of the radio power transmitting apparatus in FIG. 3.

The radio power transmitting apparatus in FIG. 5 includes a power transmitting coil 41, an oscillator 42 that generates a carrier signal of a controllable oscillating frequency, a band signal generating unit 43 that generates a band signal of an allowable transmission band, a modulation unit 44, a reflection measuring unit 46 that measures a reflected signal from the power transmitting coil 41, a demodulation unit 45, a switch 51 and a communication control unit 47 that controls these units.

The power transmitting coil 41 is a self-resonant coil or a coil that resonates with a capacitor added thereto. The coil shape is arbitrary.

The switch 51 selectively connects the power transmitting coil 41 to the band signal generating unit 43 and the communication control unit 47.

The modulation unit 44 modulates an information signal according to a predetermined modulation scheme and generates a modulated signal. The band signal generating unit 43 generates a transmission signal (band signal) having an allowable transmission band width from the modulated signal. An example of the band signal is shown at the top left of FIG. 6.

Figure 6:
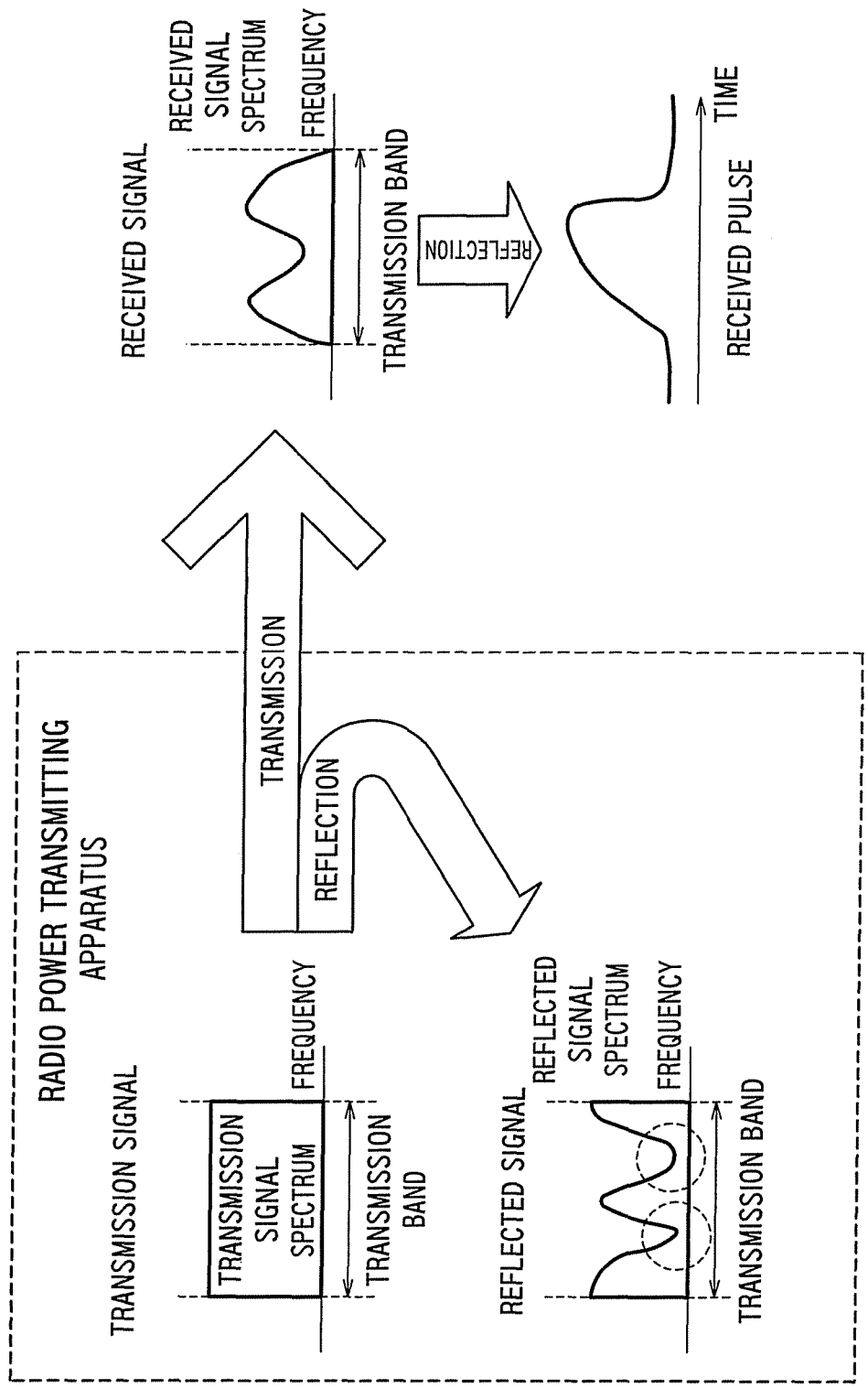
FIG. 6 is a diagram illustrating an example of a transmission signal, a received signal and a reflected signal.

Examples of the method of generating a band signal include frequency sweeping, a spread spectrum, and a method of generating a band signal by passing a modulated signal or high band signal through a band pass filter. Any method may be employed as long as a band signal can be generated. The modulation scheme for a transmission signal is preferably a modulation scheme that allows the signal to be easily demodulated such as OOK (On-Off-Keying) based on a signal of a band, but any modulation scheme may be used as long as it is a modulation scheme using a band. FIG. 6 shows a band signal variation when OOK is performed as a transmission signal.

A communication method using OOK of a band signal will be described using FIG. 6. A transmission signal generated is supplied to the power transmitting coil 41. In this case, the switch 51 is connected to the band signal generating unit 43. The transmission signal is transmitted to the power receiving coil on the radio power receiving apparatus through magnetic resonance. The radio power receiving apparatus rectifies and demodulates the received signal to extract information. The operation of the receiving side in this case is shown on the right side of FIG. 6. When a modulation scheme other than OOK is used, the signal may be subjected to demodulation processing without rectification.

Here, part of the band signal supplied to the power transmitting coil 41 is reflected and inputted to the reflection measuring unit 46. This situation is shown at the bottom left of FIG. 6. The reflection measuring unit 46 acquires a reflection characteristic (frequency characteristic and phase characteristic) based on the reflected signal and feeds back this characteristic to the communication control unit 47.

The communication control unit 47 estimates a transmission characteristic between transmission and reception using this frequency characteristic or the like and determines a carrier frequency (transmission frequency) used for transmission to the receiving apparatus, and a carrier frequency for backscattering scheme/load modulation scheme in the receiving apparatus.

When a signal spectrum generated is not constant as with, for example, spread spectrum using a spreading code, it is difficult to obtain an accurate frequency characteristic of the reflected signal. In this case, the transmission signal may be fed back from the band signal generating unit to the communication control unit 47 so as to obtain a correct reflected signal spectrum.

The communication control unit 47 controls the oscillator so as to generate a carrier signal of the determined transmission frequency and generates a transmission signal using the carrier signal of the transmission frequency. For example, a transmission signal is generated by modulating this carrier signal with transmission information. The switch 51 in this case is changed to the communication control unit 47. The transmission signal generated is supplied to the power transmitting coil 41. The transmission signal supplied to the power transmitting coil 41 is transmitted to the receiving side through magnetic coupling. This makes it possible to increase transmission power per frequency and also extend the transmission distance compared to the case where the signal is transmitted using a band signal. That is, since power per frequency increases, it is possible to improve a reception SNR. Thus, even when the transmission distance is large, radio communication is possible.

When the radio power transmitting apparatus receives a signal from the radio power receiving apparatus, the oscillator 42 generates a carrier signal having the carrier frequency according to the backscattering scheme/load modulation scheme determined in the communication control unit 47 and transmits the carrier signal from the power transmitting coil 41. The radio power receiving apparatus modulates the carrier signal using a modulation scheme such as a backscattering scheme/load modulation scheme and returns the modulated signal. The backscattering scheme/load modulation scheme is a modulation scheme in which the radio power receiving apparatus changes the load thereof and thereby generates a reflected signal (phase modulated signal or amplitude modulated signal) with changed amplitude or phase. "Load modulation" and "backscattering" are originally different terms (i.e., the load modulation means a modulation scheme that changes the load, and the backscattering refers to reading reflection), but since in the present specification, the scheme described as backscattering scheme means one that reads reflection variation by changing of the load (=load modulation), the backscattering scheme means a modulation scheme similar to load modulation. The reflected signal is received by the demodulation unit 45 via the power transmitting coil 41 and the reflection measuring unit 46, demodulated by the demodulation unit 45 and information is acquired.

A method of determining a transmission frequency used for transmission and determining a carrier frequency used for reception from the radio power receiving apparatus using the transmission characteristic of reflection of the band signal measured by the reflection measuring unit 46 will be described using FIG. 7.

Figure 7:
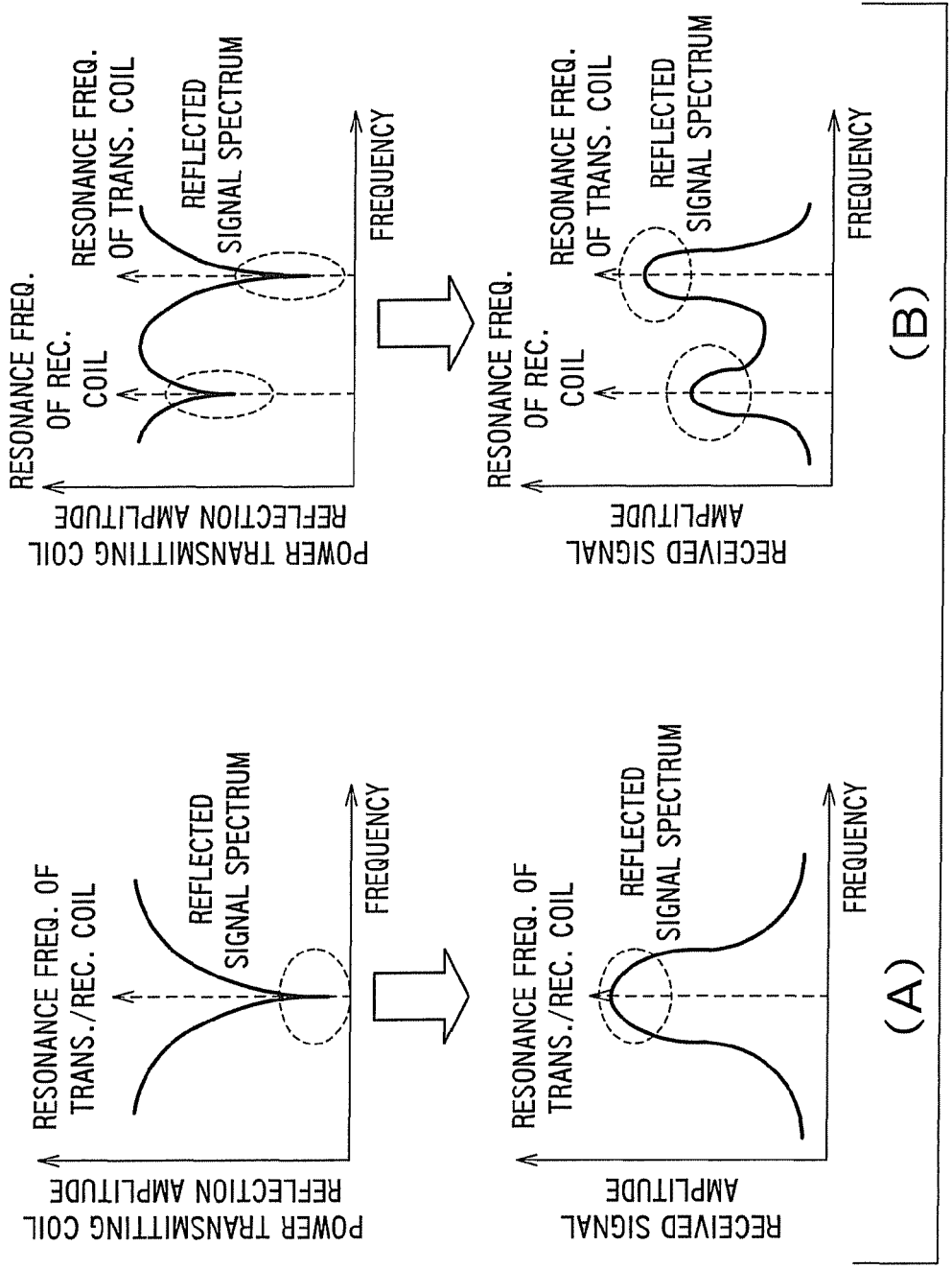
FIG. 7 are diagrams illustrating a reflected signal spectrum and a received signal spectrum when a power transmitting coil and a power receiving coil have the same resonance frequency and when these coils have different resonance frequencies.

FIG. 7 shows a spectrum of the reflected signal observed in the power transmitting coil and a spectrum of the received signal in the radio power receiving apparatus when the power transmitting coil and the power receiving coil have the same resonance frequency (FIG. 7(A)) and when these coils have different resonance frequencies (FIG. 7(B)). Here, having the same resonance frequency may mean that the difference falls within a certain range, for example, 1% of the bandwidth.

As shown in FIG. 7(A), when the power transmitting coil and the power receiving coil have the same resonance frequency, the number of the minimum value (local minimum) of the reflected signal spectrum becomes 1. In this case, the received signal spectrum on the receiving side has a maximum value at the frequency at which the reflected signal spectrum has the minimum value.

On the other hand, as shown in FIG. 7(B), when the power transmitting coil and the power receiving coil have different resonance frequencies, the reflected signal spectrum has two minimum values at the resonance frequency of the power transmitting coil and at the resonance frequency of the power receiving coil. On the receiving side, the received signal spectrum shows maximum values at these two frequencies at which the reflected signal spectrum shows minimum values.

That is, it is clear that the frequency at which the received signal spectrum becomes a maximum value can be judged from the minimum value of the reflected signal spectrum on the power transmitting side. Thus, the frequency corresponding to the minimum value of the reflected signal spectrum from the power transmitting coil can be regarded as a candidate frequency for the carrier frequency used for transmission/reception.

However, when the resonance frequencies are different, it may be difficult to judge from the reflected signal at which of the two frequencies corresponding to the minimum values, the received signal spectrum has a higher gain.

Thus, a signal is sent at any one of the candidate frequencies, and if no acknowledgment response (ACK) is received from the radio power receiving apparatus, the candidate frequency is changed, whereas if ACK is received at the changed candidate frequency, the changed candidate frequency is selected and it is thereby possible to reliably carry out communication.

Here, as described above, the signal received by the radio power transmitting apparatus from the radio power receiving apparatus is a signal modulated according to a modulation scheme such as a backscattering scheme/load modulation scheme. To increase an SN ratio of the signal received according to the backscattering scheme or load modulation scheme, it is necessary to appropriately select the frequency of the carrier transmitted from the power transmitting coil.

For example, when the resonance frequency of the power transmitting coil matches the carrier frequency, the amplitude of the reflected signal can be obtained optimally, and therefore the signal can be received at a high SN ratio. When the resonance frequency of the power transmitting coil does not match the carrier frequency, an amplitude variation of the reflected signal generated by the radio power receiving apparatus by changing the load cannot be obtained as expected and the SN ratio deteriorates. Thus, it is necessary to appropriately select the frequency of the carrier transmitted from the power transmitting coil. For example, it is possible to select a candidate frequency having a higher SN ratio.

Here, while the communication control unit 47 also generates a transmission signal using the carrier signal of the determined transmission frequency and transmits the transmission signal, the reflection measuring unit 46 may measure the reflection from the power transmitting coil 41. A variation in the transmission characteristic (frequency characteristic) is detected by judging the variation in the transmission characteristic against a threshold. As the threshold for the reflection amplitude when detecting the variation of the transmission characteristic, it is also possible to use a value obtained by adding 3 dB to the reflection amplitude before the variation. When the variation in the transmission characteristic is detected, the transmission characteristic of reflection is measured again through signal transmission using the band signal generating unit 43 to obtain transmission path information between transmission and reception (see FIG. 7). The transmission frequency is then determined again. In this case, the carrier frequency for reception may be determined again.

Figure 8:
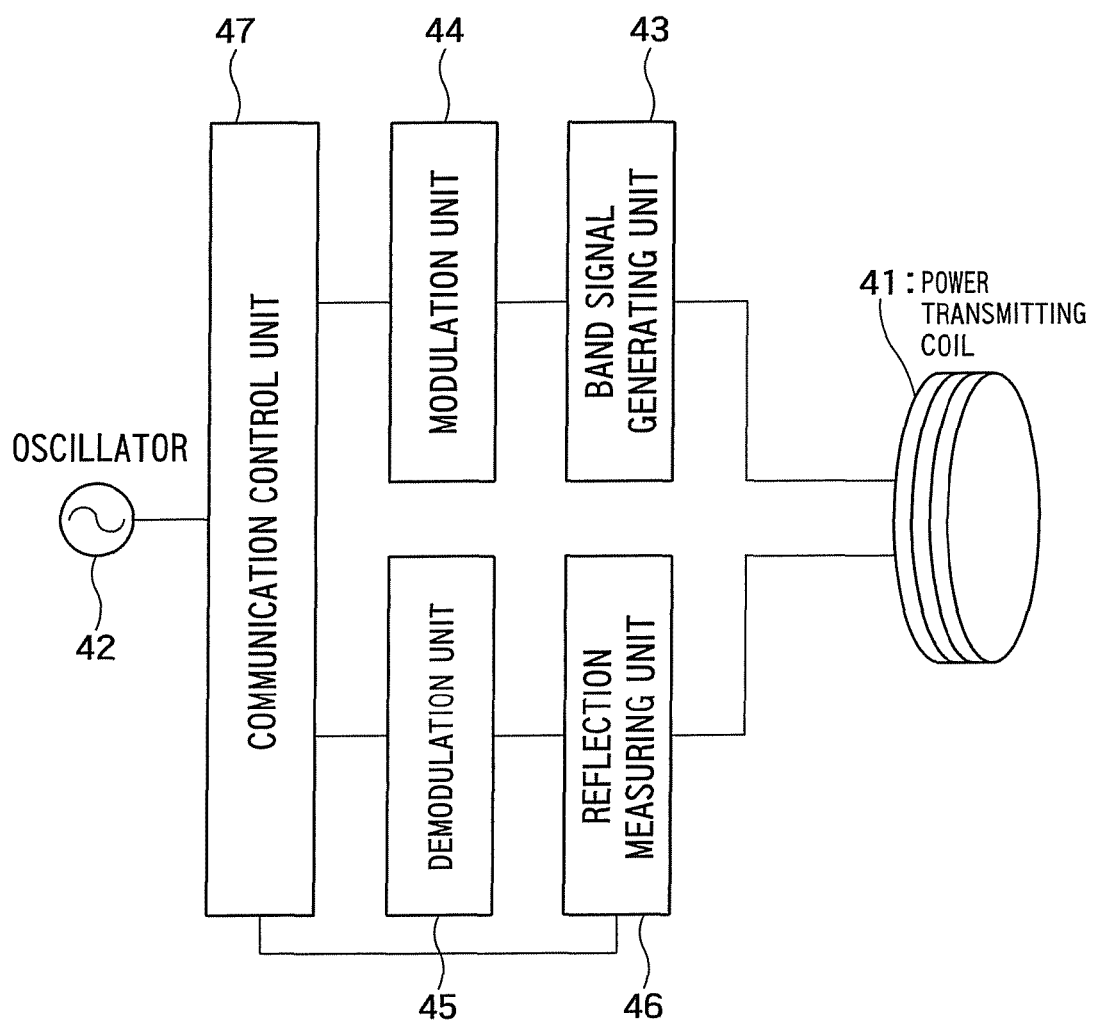
FIG. 8 is a diagram illustrating a second configuration example of the radio power transmitting apparatus in FIG. 2.

In the aforementioned configuration example, measurement is performed using the band signal and transmission is then performed using the determined transmission frequency, but transmission can always be performed using the band signal. In this case, it may be possible to remove the switch 51 from the configuration in FIG. 5, connect the power transmitting coil 41 to the band signal generating unit 43 together and remove the communication line between the power transmitting coil 41 and the communication control unit 47. FIG. 8 shows the configuration in this case.

Furthermore, in the first configuration example, the band signal carries information to be notified to the radio power receiving apparatus, but this is not essential and a band signal for the purpose of measurement without carrying information may also be used.

Figure 9:
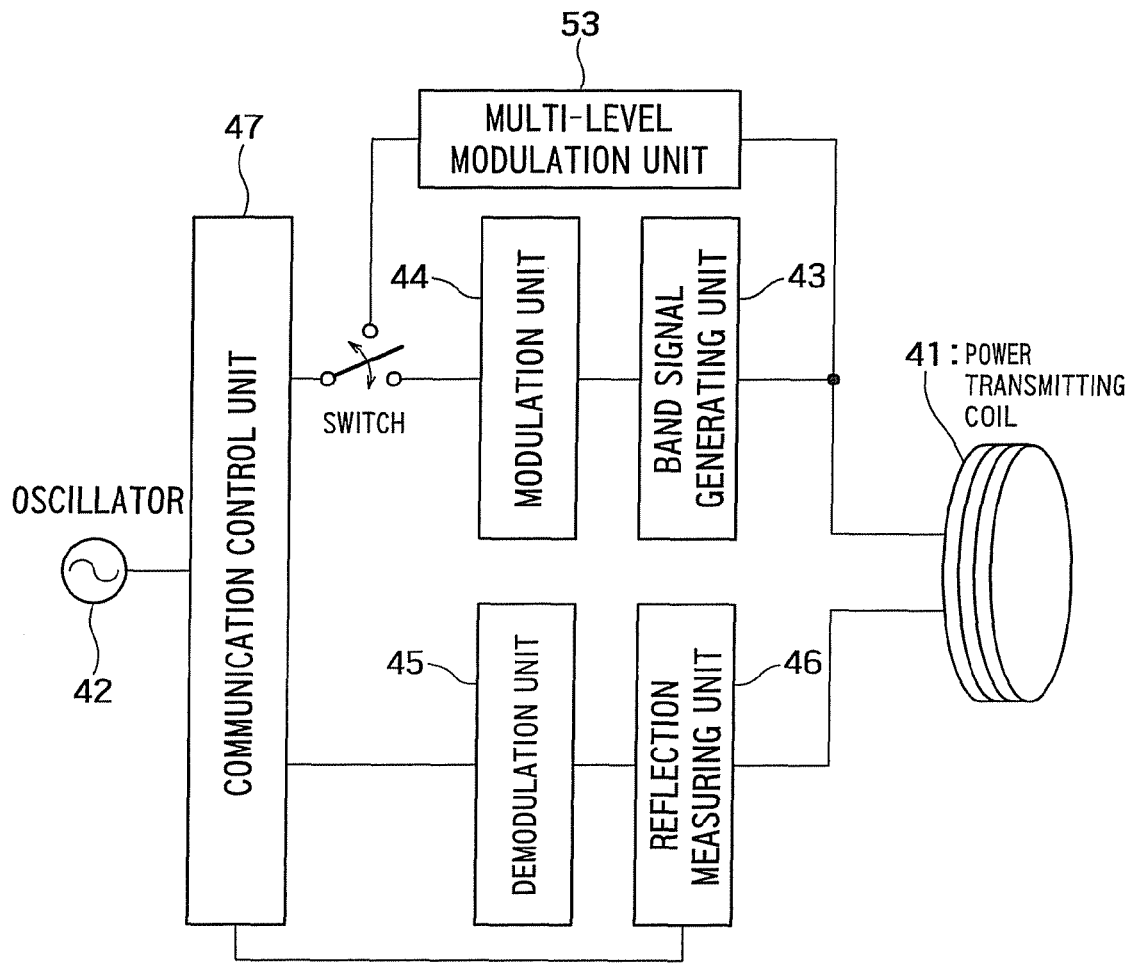
FIG. 9 is a diagram illustrating a third configuration example of the radio power transmitting apparatus in FIG. 2.

Furthermore, when transmission is performed at the determined transmission frequency, the amount of transmission information can be increased using, for example, mufti-level modulation. FIG. 9 shows a third configuration example when mufti-level modulation is used. A mufti-level modulation unit 53 is added. The mufti-level modulation unit 53 changes the modulation scheme according to the transmission characteristic, and can thereby obtain an effect of rate matching. For mufti-level modulation performed here, any one of amplitude modulation, phase modulation and amplitude phase modulation is applied. A switch is used to selectively connect the mufti-level modulation unit 53 and the modulation unit 44 to the communication control unit 47. The rest of the configuration and operation are similar to those in FIG. 5, and therefore descriptions thereof will be omitted. The function of the mufti-level modulation unit 53 may be incorporated in the communication control unit in the configuration of FIG. 5.

Figure 10:
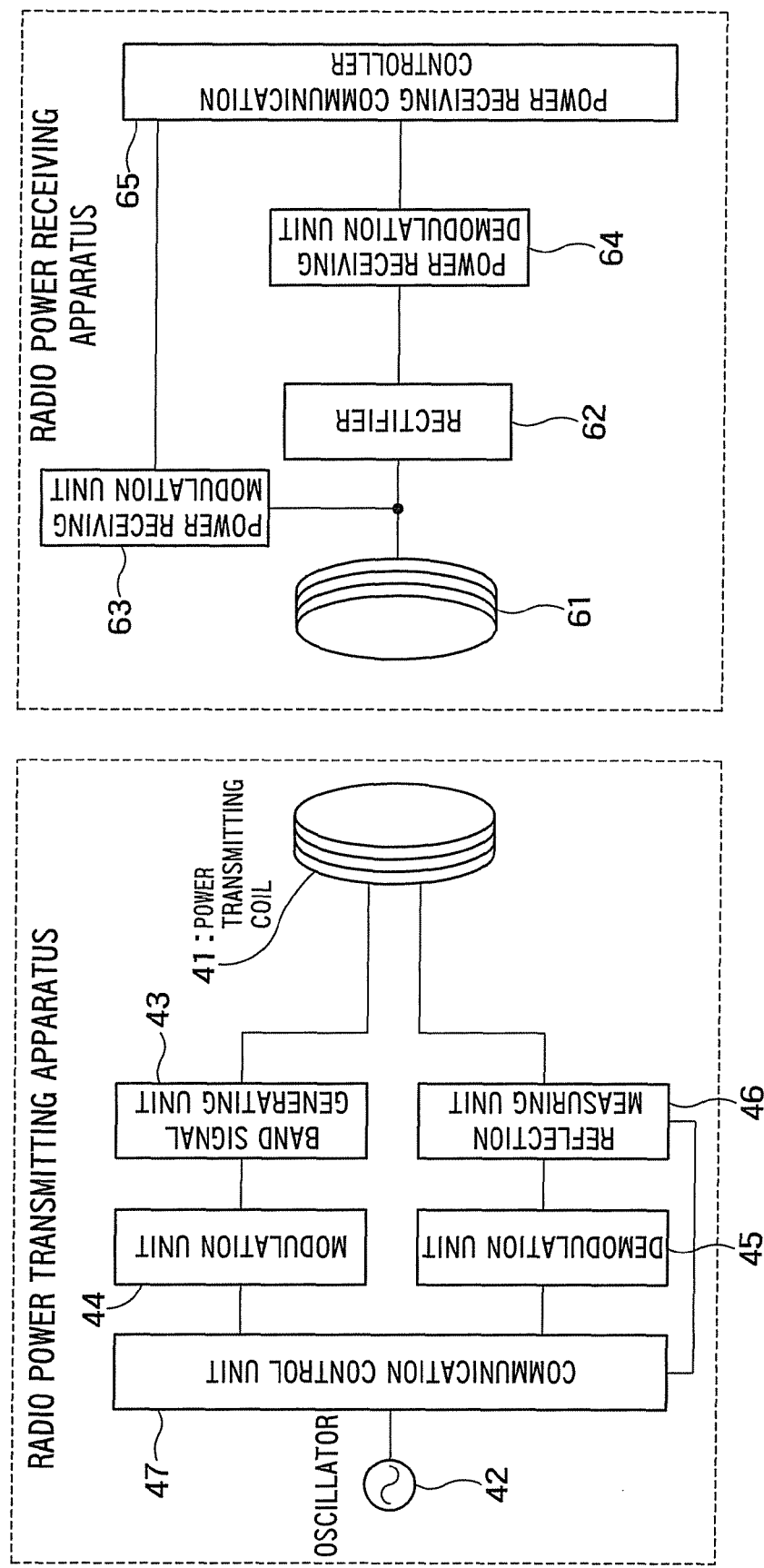
FIG. 10 is a configuration diagram of a radio power transmitting system according to an embodiment.

FIG. 10 shows a power transmitting system according to the embodiment.

This transmitting system is provided with a radio power transmitting apparatus and a radio power receiving apparatus.

The radio power transmitting apparatus has a configuration similar to that of FIG. 8.

The radio power receiving apparatus is provided with a power receiving coil 61 which is a resonance coil, a rectifier 62 that rectifies a signal obtained from the power receiving coil 61, a power receiving modulation unit 63, a power receiving demodulation unit 64 that demodulates a transmission signal received from the radio power transmitting apparatus and a power receiving communication controller 65.

The power receiving modulation unit 63 uses a backscattering scheme/load modulation scheme that generates intentional reflection in the power transmitting coil 41 of the radio power transmitting apparatus by changing a load. The power receiving modulation unit 63 modulates a carrier signal from the radio power transmitting apparatus according to this scheme and thereby transmits information. That is, according to the backscattering scheme/load modulation scheme, the amplitude and phase of the reflected signal can be changed by changing the load and modulation can be performed using the changed amplitude and phase. In this case, it is possible to realize mufti-level ASK and mufti-level PSK or QAM modulation by providing a plurality of loads to be changed and changing the amplitude and phase of the reflected signal in the power transmitting coil of the radio power transmitting apparatus.

However, when mufti-level modulation is performed, this is limited to the number of loads that can be changed and a desired variation may not be obtained for the amplitude and phase of the reflected signal observed in the power transmitting coil due to factors like transmission distance. For this reason, when performing mufti-level modulation, it is necessary to ensure that impedance matching is achieved and a coupling coefficient between the power transmitting coil and the power receiving coil is ascertained. Alternatively, it is necessary to determine a load whereby desired amplitude and phase variations are obtained in advance before performing mufti-level modulation based on the reflected signal acquired through the power transmitting coil.

A case will be assumed in the following descriptions where the radio power transmitting apparatus is provided with the power transmitting unit in FIG. 1(A) or FIG. 1(B) to carry out radio power transmission (high frequency power transmission) in addition to communication. Similarly, a case will be described where the radio power receiving apparatus is also provided with the power receiving unit in FIG. 2(A) or FIG. 2(B).

In this case, the radio communication unit is used for exchanging necessary control information to start radio power transmission.

An example of information required by the radio power transmitting apparatus to start radio power transmission is shown below. That is, the information is exchanged until power transmission starts, and the power transmission starts after exchanging the information.

(1) Confirmation/authentication of radio power receiving apparatus (2) Power required by radio power receiving apparatus (3) Safety control information (4) Transmission efficiency information (5) Impedance information Here, impedance matching becomes most important in realizing highly efficient power transmission and information necessary for impedance matching can be obtained through the aforementioned reflection frequency characteristic (see FIG. 7). Coupling between the power transmitting coil and the power receiving coil can be estimated from the difference between the two peak frequencies of this reflection frequency characteristic.

A radio power transmitting scheme called "magnetic resonance type" is known to be represented by substantially the same equivalent circuit as an inter-resonator coupling band pass filter (Reference 1: Ikuo Awai et al., "Comparative studies on resonator used for resonance type wireless power transmission," IEICE WPT 2010-01). The aforementioned two minimum values of reflection appear in two resonance modes called "magnetic wall" and "electric wall" seen in an inter-resonator coupling band pass filter (Reference 2: Yoshio Kobayashi et al., "Microwave dielectric filter," compiled by The Institute of Electronics, Information and Communication Engineers on Mar. 30, 2007). With the inter-resonator coupling band pass filter, the following equation holds between the two resonance modes and an inter-coil coupling coefficient "k".

$$k = \frac{f_{high}^2 - f_{low}^2}{f_{high}^2 + f_{low}^2}$$

where "$f_{low}$" and "$f_{high}$" denote low and high peak frequencies of the two peak frequencies respectively. Therefore, the coupling coefficient can be estimated by measuring the two peak frequencies from the reflection frequency characteristic and using this equation.

Furthermore, when the strength of coupling is self-evident or estimable, impedance matching between the power transmitting side and the power receiving side may be achieved using a matching theory of the inter-resonator coupling band pass filter. For this purpose, for example, a matching theory when designing a filter having the flattest characteristic (Butterworth filter) may be used as a matching method for magnetic resonance type radio power transmission (Reference 2).

Figure 11:
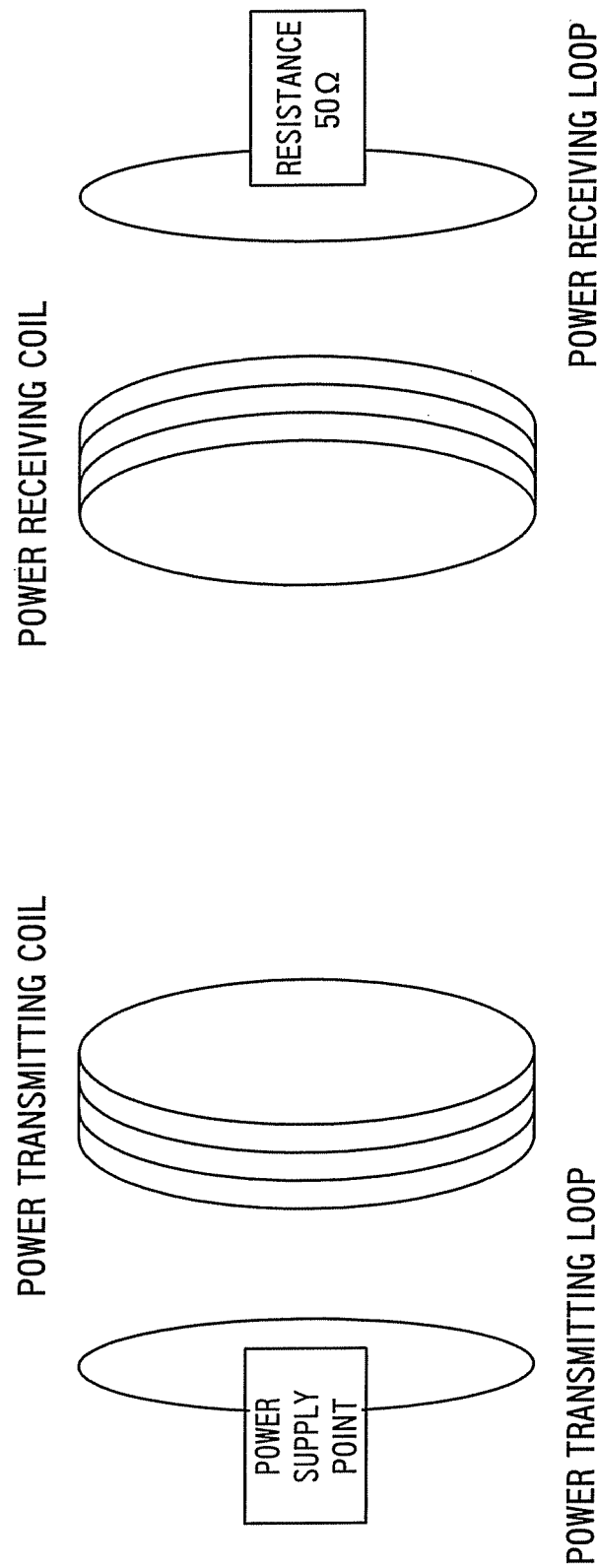
FIG. 11 is a diagram illustrating a detailed configuration example of magnetic resonance type radio power transmission.
Figure 12:
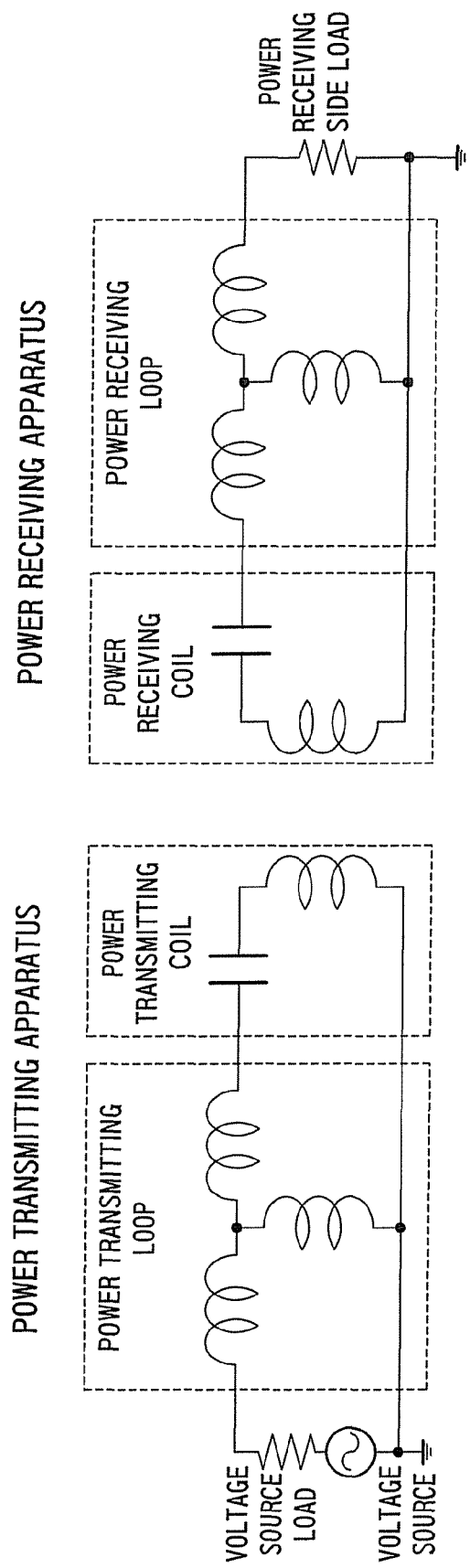
FIG. 12 is a diagram illustrating another detailed configuration example of magnetic resonance type radio power transmission.

The magnetic resonance type radio power transmission to which the present Specification is applicable may be generally constructed of a power transmitting coil and a loop electromagnetically coupled therewith as shown in FIG. 11 and impedance is adjusted by changing the coupling coefficient between this loop and the coil (=substantially equivalent to changing the distance between the loop and the coil). FIG. 12 shows an equivalent circuit of the configuration in FIG. 11.

In the above configuration, assuming that the coupling between the power transmitting loop and the power transmitting coil is "k1" (mutual inductance "M1") and the coupling between the power receiving loop and the power receiving coil is "k2" (mutual inductance "M2"), the equivalent circuit parts of the power transmitting loop and the power receiving loop shown in FIG. 12 operate as symmetric T-shaped impedance conversion units and are generally called "K inverter" (in the filter theory). This indicates that impedance can be adjusted by changing "k1" (or "M1") and "k2" (or "M2").

For example, when it is assumed that an inductor of the power transmitting coil is "Lcoil1", a conductor is "Ccoil1", a load that the voltage source may has is "R1", an inductor of the power receiving coil is "Lcoil2", a conductor is "Ccoil2" and a load resistance is "R2", impedance matching can be achieved using a parameter called "external k" expressed by the following equation (Reference 2).

$$\text{Power transmitting apparatus external } k = \frac{\omega_0 M_1^2}{L_{coil1} R_1}$$

$$\text{Power receiving apparatus external } k = \frac{\omega_0 M_2^2}{L_{coil2} R_2},$$

where "ω0" is a value obtained by multiplying resonance frequency "f0" of coil by 2π.

For example, it is known that when impedance matching is performed so as to have a (flattest) frequency characteristic such as a Butterworth characteristic, the external "k"s of the power transmitting apparatus and power receiving apparatus in the above equation and coupling coefficient "kcoil" between the power transmitting coil and the power receiving coil may be set to the following conditions (Reference 2).

Power transmitting apparatus external k=power receiving apparatus external k=kcoil "M1" and "M2" need to be changed to change the power transmitting apparatus external "k", that is, impedance matching can be achieved by changing the coupling between the power transmitting loop and the power transmitting coil and the coupling between the power receiving loop and the power receiving coil. Since the condition in the above equation is an example (matching method having a Butterworth characteristic), other conditions may also be used.

The external "k" can be calculated using a peak value of the reflection frequency characteristic and a peak frequency. The impedance matching method is as shown above.

As described so far, using the radio power transmitting apparatus and the radio power receiving apparatus of the present embodiment, it is possible to carry out power transmission using the power transmitting coil and the power receiving coil even if coupling between the power transmitting coil and the power receiving coil is unknown and increase the transmission rate of radio communication and improve the radio power transmission efficiency using reflection information.

Figure 13:
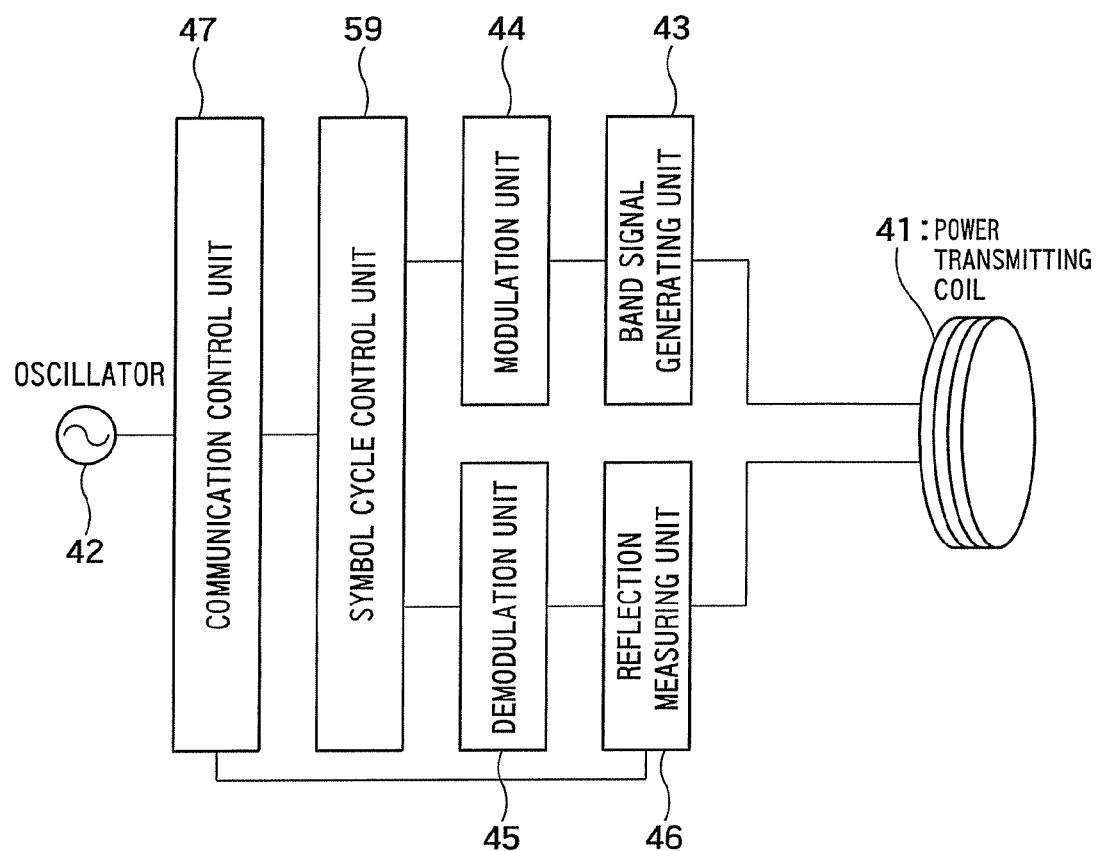
FIG. 13 is a diagram illustrating a fourth configuration example of the radio power transmitting apparatus in FIG. 2.

FIG. 13 shows a fourth configuration example of the radio power transmitting apparatus in FIG. 3.

A symbol cycle control unit 59 is added to the second configuration example shown in FIG. 8. Since the rest of the configuration is the same as the second configuration example, descriptions thereof will be omitted. Here, an example is described where the symbol cycle control unit 59 is added to the second configuration example, but the symbol cycle control unit 59 may be added to the first configuration example in FIG. 5 or to the third configuration example in FIG. 9.

Figure 14:
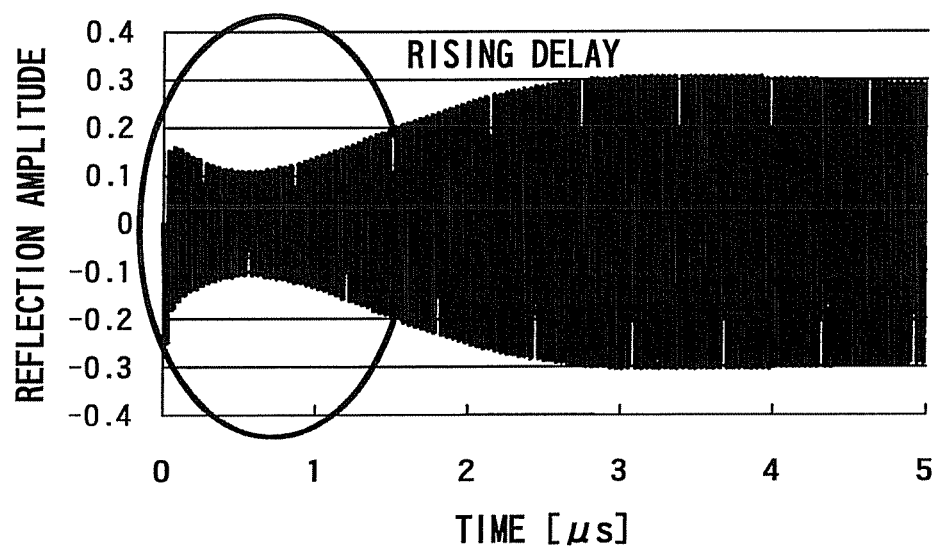
FIG. 14 is a diagram illustrating a rising delay characteristic of a reflected signal.

When a signal is received from the radio power receiving apparatus according to a backscattering scheme/load modulation scheme, a rising delay as shown in FIG. 14 is generated in the received signal (reflected signal of the power transmitting coil) from the radio power receiving apparatus according to the strength of coupling between the power transmitting coil 41 and the power receiving coil.

This rising delay is small when the coupling between the power transmitting coil and the power receiving coil is strong and the rising delay is greater when the coupling is weak. Therefore, it is necessary to set the symbol cycle of signal transmission to more than a length of a rising delay or equal to widely cover various strengths of the coupling between the power transmitting coil 41 and the power receiving coil.

In this case, when the coupling between the power transmitting coil 41 and the power receiving coil is strong and the rising delay is small, the symbol cycle is too long, and it is therefore not possible to achieve an optimum transmission rate.

Therefore, an optimum transmission rate can be achieved by making the symbol cycle variable according to the strength of the coupling between the power transmitting coil 41 and the power receiving coil using the symbol cycle control unit 59 shown in FIG. 13. The communication control unit can perform control so that signal communication is carried out in the determined symbol cycle.

As an index for making the symbol cycle variable, it is possible to adopt a method of creating a map that associates the strength of coupling between the power transmitting coil 41 and the power receiving coil with the rising delay in advance, storing the map in a memory and reading the stored data. Alternatively, a method of measuring the rising delay of reflection using the reflection measuring unit 46 may also be used. It is naturally possible to use other methods.

When the transmission frequency of the transmission signal of the radio power transmitting apparatus is different from the carrier frequency for reception from the radio power receiving apparatus, an optimum symbol cycle (first symbol cycle) of the transmission signal of the radio power transmitting apparatus may or may not match an optimum symbol cycle (second symbol cycle) of the received signal from the radio power receiving apparatus. For this reason, an appropriate symbol cycle needs to be set for each signal.

The aforementioned method may be used for the second symbol cycle determining method. The first symbol cycle determining method may also be realized by feeding back the rising delay information measured using the radio power receiving apparatus. Since the first symbol cycle depends on half width of the transmission characteristics of the power transmitting coil and the power receiving coil, the first symbol cycle may be determined from the half width of the transmission characteristic (frequency characteristic) estimated when transmitting a band signal.

The embodiment above stated is applicable to a magnetic sensor or the like using a resonance phenomenon.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A radio power transmitting apparatus comprising:
a power transmitting coil configured to be supplied with a signal and transmit the signal to a power receiving coil of a radio power receiving apparatus through magnetic coupling;
a band signal generating unit configured to generate a band signal having an allowable transmission band and supply the band signal to the power transmitting coil as the signal;
a reflected signal measuring unit configured to measure a reflected signal of the band signal from the power transmitting coil;
an oscillator configured to generate a carrier signal having a controllable oscillating frequency; and
a communication control unit configured to determine a transmission frequency based on a frequency characteristic of the reflected signal and perform control so that a transmission signal generated by modulating the carrier signal of the transmission frequency is supplied to the power transmitting coil as the signal,
wherein:
the communication control unit determines a frequency of the carrier signal for load modulation to be transmitted to the radio power receiving apparatus based on the frequency characteristic of the reflected signal,
the carrier signal of the determined frequency is supplied to the power transmitting coil,
the radio power transmitting apparatus further comprises a symbol cycle control unit configured to determine a symbol cycle of the carrier signal for load modulation based on the frequency characteristic of the reflected signal, and the communication control unit performs control so that the carrier signal for load modulation is transmitted in the determined symbol cycle.

2. The apparatus according to claim 1, wherein the transmission frequency is a frequency at which amplitude of the reflected signal becomes a local minimum.

3. The apparatus according to claim 1, wherein the frequency of the carrier signal is a frequency at which amplitude of the reflected signal becomes a local minimum.

4. The apparatus according to claim 1, wherein the transmission signal is generated by multi-level modulating the carrier signal of the transmission frequency.

5. The apparatus according to claim 1, further comprising a power transmitting unit configured to generate a power signal and give the power signal to the power transmitting coil,
wherein the power transmitting coil transmits the power signal to the power receiving coil through magnetic coupling, and
wherein impedance matching is performed with the radio power receiving apparatus using a coupling coefficient between the power transmitting coil and the power receiving coil, the coupling coefficient being determined based on the frequency characteristic.

6. A radio power transmitting system comprising:
the radio power transmitting apparatus according to claim 1; and
a radio power receiving apparatus,
wherein the radio power receiving apparatus comprises:
the power receiving coil;
a power receiving demodulation unit configured to demodulate the transmission signal obtained by the power receiving coil; and
a power receiving modulation unit configured to load-modulate the carrier signal obtained by the power receiving coil.

7. The system according to claim 6, wherein the power receiving modulation unit performs modulation according to any one of phase modulation, amplitude modulation, frequency modulation and quadrature phase amplitude modulation.

8. The system according to claim 6, wherein:
the radio power transmitting apparatus further comprises a power transmitting unit configured to generate a power signal and give the power signal to the power transmitting coil,
the power transmitting coil transmits the power signal to the power receiving coil through magnetic coupling,
the radio power receiving apparatus further comprises a power receiving unit configured to use the power signal received by the power receiving coil, and
both of power transmission and signal communication are performed through time-division or frequency-division multiplexing between the radio power transmitting apparatus and the radio power receiving apparatus.

9. The apparatus according to claim 1, wherein the symbol cycle control unit determines the symbol cycle of the carrier signal for load modulation based on a rising delay of a received signal from the radio power receiving apparatus which corresponds to the carrier signal for load modulation transmitted to the radio power receiving apparatus.

10. The apparatus according to claim 1, wherein the symbol cycle control unit determines the symbol cycle of the carrier signal for load modulation based on strength of coupling between the power transmitting coil and the power receiving coil.

11. A radio power transmitting apparatus comprising:
a power transmitting coil configured to be supplied with a signal and transmit the signal to a power receiving coil of a radio power receiving apparatus through magnetic coupling;
a band signal generating unit configured to generate a band signal having an allowable transmission band and supply the band signal to the power transmitting coil as the signal;
a reflected signal measuring unit configured to measure a reflected signal of the band signal from the power transmitting coil;
an oscillator configured to generate a carrier signal having a controllable oscillating frequency; and
a communication control unit configured to specify a plurality of candidate frequencies at which amplitude of the reflected signal becomes a local minimum, determine one of the candidate frequencies as a transmission frequency, and perform control so that a transmission signal generated by modulating the carrier signal of the transmission frequency is supplied to the power transmitting coil as the signal.

12. The apparatus according to claim 11, wherein the communication control unit determines, based on the reflected signal, one of the candidate frequencies at which a gain of reception in the radio power receiving apparatus becomes maximum, as the transmission frequency.

13. The apparatus according to claim 11, wherein the communication control unit performs a candidate frequency selection process in which the communication control unit (i) chooses any one of the candidate frequencies, (ii) transmits a transmission signal generated by modulating the carrier signal of the chosen candidate frequency via the power transmission coil, (iii) determines, if an acknowledgment response is received from the radio power receiving apparatus, the chosen candidate frequency as the transmission frequency, and (iv) if the acknowledgment response is not received from the radio power receiving apparatus, chooses another candidate frequency of the candidate frequencies, transmits a transmission signal generated by modulating the carrier signal of the other chosen candidate frequency via the power transmission coil, and determines, if an acknowledgment response is received from the radio power receiving apparatus, the other chosen candidate frequency as the transmission frequency,
wherein the communication control unit repeats the candidate selection frequency process until a chosen candidate frequency is determined as the transmission frequency.

* * * * *